United States Patent
Ciechanowski et al.

(10) Patent No.: US 10,347,043 B2
(45) Date of Patent: Jul. 9, 2019

(54) CORE ANIMATION PORTALS

(71) Applicant: Apple Inc., Cupertino, CA (US)

(72) Inventors: Bartosz Ciechanowski, Cupertino, CA (US); Chendi Zhang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 46 days.

(21) Appl. No.: 15/615,437

(22) Filed: Jun. 6, 2017

(65) Prior Publication Data
US 2018/0336721 A1    Nov. 22, 2018

Related U.S. Application Data

(60) Provisional application No. 62/506,988, filed on May 16, 2017.

(51) Int. Cl.
*G06T 13/20*    (2011.01)
*G06T 17/00*    (2006.01)
*G06T 5/00*     (2006.01)

(52) U.S. Cl.
CPC ............ *G06T 17/005* (2013.01); *G06T 13/20* (2013.01); *G06T 5/002* (2013.01); *G06T 2200/24* (2013.01); *G06T 2207/20024* (2013.01); *G06T 2210/62* (2013.01); *G06T 2213/08* (2013.01)

(58) Field of Classification Search
CPC ......... G06T 17/005; G06T 1/60; G06T 13/20; G06T 3/60; G06T 5/002; G06T 2200/24; G06T 2207/20024; G06T 2210/62
See application file for complete search history.

(56) References Cited

U.S. PATENT DOCUMENTS

| 7,290,216 | B1 | 10/2007 | Kawahara | |
|---|---|---|---|---|
| 9,075,631 | B2 | 7/2015 | Lewin | |
| 9,223,484 | B2 | 12/2015 | Krane | |
| 9,244,583 | B2 | 1/2016 | Lovitt | |
| 10,044,522 | B1* | 8/2018 | Shamis | H04L 12/44 |
| 2003/0076328 | A1* | 4/2003 | Beda | G06T 13/00 345/503 |
| 2005/0243090 | A1* | 11/2005 | Schneider | G06T 17/005 345/440 |
| 2014/0019894 | A1 | 1/2014 | Mitchell | |

* cited by examiner

*Primary Examiner* — King Y Poon
*Assistant Examiner* — Vincent Peren
(74) *Attorney, Agent, or Firm* — Blank Rome LLP

(57) ABSTRACT

Improved techniques of managing graphical user interface (GUI) objects based on portal layers (or simply portals) are described. A portal refers to a logical reference to a GUI object specified by an application that enables an operating system to access and process the specified GUI object without affecting any of the rules/assumptions required by the application for the specified GUI object. Portals can assist with reducing computational resources required for rendering by assisting with reducing or eliminating the use of snapshots for rendering. One embodiment includes generating a layer tree; identifying a first sub-tree of the layer tree as portal content; establishing a portal as a reference to the portal content in a second sub-tree of the layer tree; generating a render tree based on the layer tree; rendering the render tree to create an image; and presenting the image on a display.

21 Claims, 9 Drawing Sheets

CORE ANIMATION PORTALS

CROSS-REFERENCE TO RELATED APPLICATIONS

This non-provisional U.S. patent application claims priority to U.S. provisional patent application No. 62/506,988, filed May 16, 2017. U.S. provisional patent application No. 62/506,988 is hereby incorporated by reference in its entirety.

FIELD

Embodiments relate generally to the field of computer graphics, and more particularly, to managing graphical user interface (GUI) objects in a GUI environment.

BACKGROUND

Most modern computer systems employ operating systems (OSs) that support graphical user interfaces (GUIs). Generally, the OS renders and presents content on a display device via a GUI using a graphics rendering and animation (GRA) infrastructure.

An application (e.g., a messaging application, a calendar application, a photography application, etc.) may be developed to include rules and/or assumptions that are received as input by a GRA infrastructure. These rules/assumptions enable the GRA infrastructure to render and present the application's GUI objects in an OS's GUI (a GUI implemented by a computer system executing an OS is referred to herein as a "system GUI"). Additionally, these rules/assumptions may prevent the application's GUI objects from being manipulated by the computer system and/or OS such that the application's GUI objects are presented in a specific manner via the system GUI. Manipulation of GUI objects includes, but is not limited to, transforming the GUI objects between locations in the system GUI, blurring a GUI object, resizing a GUI object, scaling a GUI object, and changing the opacity/transparency of a GUI object.

For an illustrative example, a messaging application may be developed to include rules and/or assumptions that prevent one of the application's GUI objects from being moved from a first location to a second location within a system GUI. For this example, the computer system executing the OS may be capable of presenting the application's immovable GUI object as being moved from the first location to the second location even though the application's rules/assumptions prevent such an operation. One way such a presentation is achieved is by capturing a snapshot or screenshot of the application's immovable GUI object, moving the snapshot to the new location in the system GUI, rendering the snapshot in its new location, and presenting an image of the snapshot in its new location. For a real-world example, when a multimedia message that includes an image is presented on a touchscreen display of computer system (e.g., a smartphone, a tablet computer, a laptop computer, etc.), a force touch input may be used to "pop" the image out of the received message (i.e., enlarge the image, overlay the enlarged image on the rest of received message, and blur all GUI objects below the enlarged image). For this example, the messaging application may include rules/assumptions that prevent the image in the received image from being moved within the system GUI (i.e., from being "popped"). For this example, the OS may enable the system GUI to "pop" the image by taking a snapshot of the image and processing the snapshot to achieve "pop" effect.

One problem with the use of snapshots in system GUI operations is that such snapshots increase the amount of computational resources required for presenting a system GUI. Specifically, each snapshot and its subsequent presentation in a system GUI requires memory, processing power, and the like. Also, the required amount of computational resources increases as time progresses. This is because there may be a requirement to capture multiple snapshots of the same application's GUI object as time progresses given that an appearance of the application's GUI object within a system GUI may change over time. Furthermore, the use of a snapshot is limited to a specific type of media—a non-moving image captured at a specific time instance (e.g., a photograph, etc.). Snapshots are not suitable for other types of media—e.g., video, audio, live photographs, GIFs, etc.—that progress over a time duration (i.e., a plurality of time instances).

In one scenario, an application's GUI objects are rendered and presented on a display device using a CORE ANIMATION® GRA infrastructure. CORE ANIMATION® is available on both Apple's iOS and OS X® for use by developers to animate the views and other visual elements of their applications. In this and other GRA infrastructures, every snapshot creates at least one new node in the GRA's infrastructure's layer and/or render trees. Consequently, the layer and/or render trees will progressively require more computational resources as additional snapshots are captured and manipulated (e.g., memory, processing power, etc.). For example, as the sizes of the layer and render trees increase due to the additions of new nodes for each snapshot, additional memory is required for storage of the trees and additional processing power is required to process the growing trees.

SUMMARY

Improved techniques of managing graphical user interface (GUI) objects based on portal layers (or simply portals) are described. A portal refers to a logical reference to a GUI object specified by an application that enables an operating system to access and process the specified GUI object without affecting any of the rules/assumptions required by the application for the specified GUI object. Portals are not snapshots. As a result, portals can assist with reducing computational resources required for rendering by assisting with reducing or eliminating the use of snapshots for rendering. For example, the sizes of layer and/or render trees that include portals may be smaller than layer and/or render trees that include snapshots, the processing power required to process layer and/or render trees that include portals may be smaller than the processing power required to process layer and/or render trees that include snapshots, etc. One embodiment includes generating a system-based layer tree that includes multiple sub-trees. At least one of the multiple sub-trees corresponds to a client application's content (i.e., an application-only layer tree, an application-only render tree, etc.). The embodiment also includes identifying a first sub-tree of the system-based layer tree that corresponds to a client application's content as portal content and establishing a portal in a second sub-tree of the system-based layer tree. The established portal is a logical reference to the portal content. For the embodiment, the pixel is not a snapshot and the first and second sub-trees are different from each other. The embodiment also includes generating a system-based render tree based on the system-based layer tree that includes the portal. The generated system-based render tree may be rendered to create an image and the image may be presented on a display.

Other features and advantages of embodiments described herein will be apparent from the accompanying drawings and from the detailed description that follows.

BRIEF DESCRIPTION OF THE DRAWINGS

Embodiments described herein are illustrated by way of example and not limitation in the figures of the accompanying drawings in which like references indicate similar elements.

DETAILED DESCRIPTION

Figure 1:
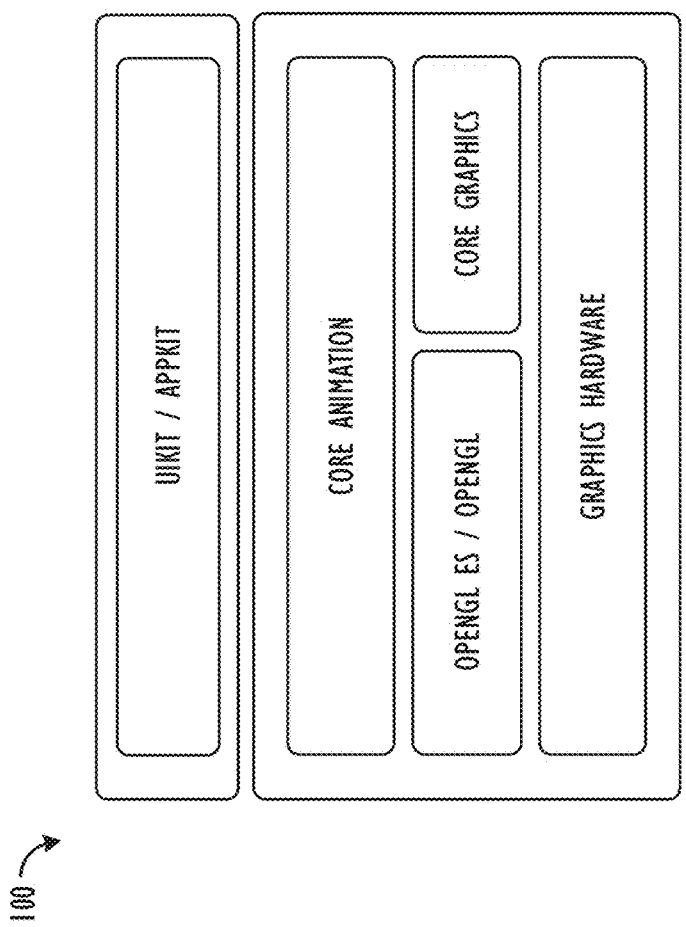
FIG. 1 is a block diagram illustrating an exemplary graphics rendering and animation (GRA) infrastructure in accordance with one embodiment.

Embodiments described herein are directed to improved techniques of managing graphical user interface (GUI) objects in a GUI environment. The improved techniques are based on portal layers (or simply portals) that can assist with reducing computational resources required for rendering GUI objects because portals can assist with reducing or eliminating the use of snapshots for rendering GUI objects. As used herein, a portal refers to a logical reference to a GUI object specified by an application that enables an OS to access and process the specified GUI object without affecting any of the rules/assumptions required by the application for the specified GUI object. A portal is not a replication of a specified GUI object, and as a result, a portal is not a snapshot. Instead, a portal "points to" or "references" an application's GUI object. Consequently, a portal can be an alternative to a snapshot of an application's GUI object. As stated above, portals can assist with reducing computational resources required for rendering GUI objects. For example, the sizes of layer and/or render trees that include portals may be smaller than layer and/or render trees that do not make use of portals. Further, the processing power required to process layer and/or render trees that include portals may be smaller than the processing power required to process layer and/or render trees that do not include portals. Portals can also assist with enabling an OS to add additional functionality to an application's GUI objects presented via the system GUI. For example, and with regard to the real-world example described above in the Background section, the OS may be enabled, via a portal, to present a "popping" effect on the image in the system GUI without the need for snapshots of GUI objects.

Embodiments described herein may be implemented within an OS (e.g., iOS, OS X®, etc.). Some embodiments described herein can be implemented within a GRA infrastructure (e.g., CORE ANIMATION®, etc.). Some embodiments may be implemented by one or more processors of a computer system (e.g., a mobile computer, a smartphone, a desktop, a tablet computer, a laptop computer, a server, a workstation, a wearable device, an Internet-of-Things (IoT) device, a vehicle, or any other known computer system).

For one embodiment, one or more processors of a rendering system are configured to generate a system-based layer tree comprised of multiple sub-trees. Each sub-tree may include one or more nodes. At least one of the sub-trees in the render tree includes one or more portions of a client application's content (i.e., an application-only layer tree and/or an application-only render tree). For this embodiment, the processor(s) identify a first sub-tree of the system-based layer tree as portal content. Next, the processor(s) establish a portal in a second sub-tree of the system-based layer tree. The first and second sub-trees are different from each other. The portal, as explained above, is a logical reference to the portal content and is not a replication of the portal content (i.e., not a snapshot of the portal content). The processor(s) generate a system-based render tree based on the layer tree that includes the portal. The processor(s) can also render the system-based render tree to a memory to create an image; and present the image via a system GUI on a display device.

FIG. 1 is a block diagram illustrating an exemplary graphics rendering and animation (GRA) infrastructure 100. Such a GRA infrastructure may be utilized to manage content in an efficient fashion. The exemplary GRA infrastructure, including CORE ANIMATION®, is a general purpose system for animating "views" and other visual elements of an application. (As used herein, a "view" refers to an NSView object, which defines the basic drawing, event-handling, and printing architecture of an application). In one embodiment, CORE ANIMATION® is a technology that integrates with views to provide better performance and support for animating view content. CORE ANIMATION® achieves this behavior by capturing content, e.g., by caching the contents of views into bitmaps that can be manipulated directly by the graphics hardware. In some cases, this caching behavior might require programmers to rethink how an application's content is presented and managed, but most of the time the use of CORE ANIMATION® appears seamless to the programmer. In addition to caching view content, CORE ANIMATION® also defines a way to specify arbitrary visual content, integrate that content within views, and animate it along with everything else.

CORE ANIMATION® is not a drawing system itself. Instead, it is an infrastructure for compositing and manipulating an application's content in hardware. At the heart of this infrastructure are layer objects, which are used to manage and manipulate an application's content. A layer captures an application's content, e.g., in the form of a bitmap that may be manipulated easily by the graphics hardware. In most applications, layers are used as a way to manage the content of views, but standalone layers may also be created, depending on the needs of a particular application.

For some embodiments, layer objects are two-dimensional (2D) surfaces organized in a three-dimensional (3D) space, and are the elemental units of the CORE ANIMATION® infrastructure. Like views, layers manage information about the geometry, content, and visual attributes of their surfaces. Unlike views, layers do not define their own appearance. A layer merely manages the state information surrounding a bitmap or other content. The content itself can be the result of a view drawing itself or a fixed image that is specified. For this reason, the main layers used in an application are considered to be model objects because they primarily manage data.

Most layers do not do any actual drawing in an application. Instead, a layer captures the content an application provides via drawing instructions, which may be cached in a bitmap or other format, sometimes referred to as the "backing store." When a property of the layer is subsequently changed, the corresponding state information associated with the layer object is changed. When a change triggers an animation, CORE ANIMATION® passes the layer's content and state information to the graphics hardware, which does the work of rendering the content using the new information.

Layers can be arranged hierarchically to create parent-child relationships. The arrangement of layers affects the visual content that they manage in a way that is similar to views. The hierarchy of a set of layers that are attached to views mirrors the corresponding view hierarchy. Standalone layers may also be added into a layer hierarchy to extend the visual content of an application beyond just the created views.

Figure 2:
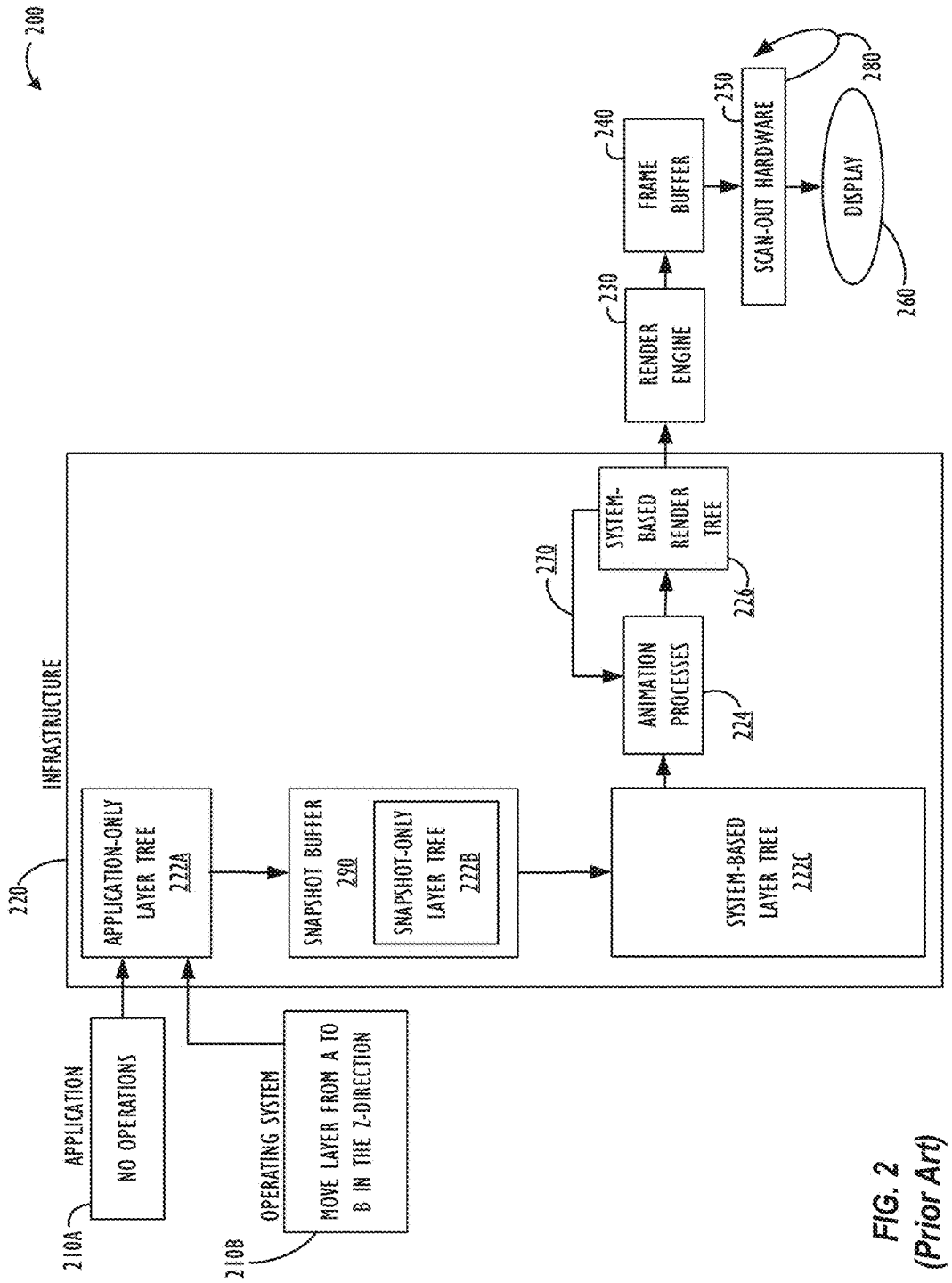
FIG. 2 illustrates a rendering process in accordance with the prior art.

Referring now to FIG. 2, an embodiment of a rendering process 200 is shown in accordance with the prior art. In the rendering process 200, an application 210A and/or an OS 210B inputs graphical user interface (GUI) information into a backing store (not shown), and a GRA infrastructure 220 (e.g., a CORE ANIMATION® GRA infrastructure, etc.) is used to process the GUI information in the backing store. Once the GRA infrastructure 220 has processed the GUI information, a render engine 230 renders the processed information into a frame buffer 240. Although not shown in FIG. 2, the render engine 230 typically renders processed information into an assembly buffer that is then composited into the appropriate location of the frame buffer 240. When compositing is completed, scan-out hardware 250 outputs the rendered information in the frame buffer 240 to a display 260 using a frame rate 280 of the display 260.

The processing performed by the GRA infrastructure 220 includes graphics animation and compositing operations for the application 210A and/or the OS 210B. To perform the operations, the GRA infrastructure 220 divides the processing into: (i) a system-based layer tree 222C comprised of an application-only layer tree 222A and a snapshot-only layer tree 222B; and (ii) a system-based render tree 226. As used herein, a layer tree is a description of the content within a context, so a layer (and especially a layer hierarchy) specifies content, while a context represents ownership and drawing of this content. In a two-tree approach comprised of the layer tree 222C and the render tree 226, the application-only layer tree 222A is exposed to the application 210A and the OS 210B, while the snapshot-only layer tree 222B and the system-based layer tree 222C are exposed to the OS 210B (but not the application 210A). In this way, the layer tree 222C is used for implicit animation and implicit layout of graphics objects (also referred to herein as layers). On the other hand, the render tree 226 is manipulated and traversed by the render engine 230.

The application-only layer tree 222A includes a data structure that interfaces with the application 210A and the OS 210B. Also, each of the layer trees 222B-C includes its own data structure that interfaces with the OS 210B. The data structures of each of the layer trees 222A-C are configured to hold a hierarchy of layers. The layers are objects having various properties and attributes and are used to build a system GUI that is based on the application 210A and the OS 210B. (The terms "property" and "attribute" may be used interchangeably in the present disclosure). In general, for example, the layers can include content, windows, views, video, images, text, media, etc. The data structures of each layer tree 222A-C are preferably as small and compact as possible. Therefore, many of the attributes of the layers preferably have default values kept in an extended property dictionary, such as NSDictionary of Apple's COCOA® environment.

For one embodiment, the application 210A interacts with the application-only layer tree 222A of the GRA infrastructure 220 to manipulate the hierarchy of layers in the layer tree 222A. The application 210A can be any computer application or client process that manipulates or changes the layers being displayed. When the application 210A commits an event or change to the layer tree 222A, the GRA infrastructure 220 determines what events or changes are made at each layer of the layer tree 222A by the application 210A. These changes are propagated to the system-based layer tree 222C used to build a system GUI that is based on the application 210A and the OS 210B.

Furthermore, the OS 210B can also interact with the application-only layer tree 222A of the GRA infrastructure 220 when OS 210B needs to manipulate the hierarchy of layers in the layer tree 222A. In this scenario, a snapshot buffer 290 receives a snapshot of the layer tree 222A, which is illustrated in FIG. 2 as the snapshot-only layer tree 222B. It is on this snapshot-only layer tree 222B (and not the application-only layer tree 222A) that the OS 210B can make changes used to manipulate the hierarchy of layers. When the OS 210B commits an event or change to the layer tree 222B, the GRA infrastructure 220 determines what events or changes are made at each layer of the layer tree 222B by the OS 210B. These changes are propagated to the system-based layer tree 222C used to build the system GUI that is based on the application 210A and the OS 210B. In this way, the OS 210 can commit changes to the snapshot nodes (i.e., copied nodes) of the layer tree 222B without affecting the layer tree 222A.

As shown, the GRA infrastructure 220 generates the system-based layer tree 222C as a combination of the layer trees 222A-B. Here, the differences between the layer tree 222A and the layer tree 222B are added to the layer tree 222A to form the system-based layer tree 222C. The system-based layer tree 222C is then committed to an animation and compositing process 224 of the GRA infrastructure 220. This process 224 determines one or more animation functions of the GRA infrastructure 220 to use on the system-based layer tree 222C based on the committed events or changes for each layer of the layer trees 222A-B.

The animation and compositing process 224 then performs animation of the events or changes and configures the layout of the layers in the render tree 226. The animation and layout of the render tree 226 is then rendered by the render engine 230 and output to the frame buffer 240. Any manipulations of layers made by the application 210A and/or the OS 210B to the layer tree are not evaluated at the frame rate 280 of the display 260. Instead, changes in the render tree 226 are traversed and updated at the frame rate 380.

As alluded to above, the GRA infrastructure 220 separates the animation and compositing of layers from the application 210A and/or OS 210B. For example, when the application 210A and/or the OS 210B makes changes, the affected layers in the layer tree 222C are changed from one state to another. State changes reflected in the layers of the layer tree 222C are then "percolated" to the physical display 460 by animating the changes and compositing the layers of the render tree 226 from the initial state of the layers to their final or end-state. This form of animation and composition is referred to herein as "implicit animation" and is part of the animation and compositing process 224.

By using implicit animation in the GRA infrastructure 220, the application 210A and/or the OS 210B does not have to include code for animating changes of the layers to be displayed (e.g., movement, resizing, etc.). Accordingly, any code required for animating layers can be minimized in the application 210A and/or the OS 210B. As shown in simplified form, for example, the application 210A and/or the OS 210B may not require an embedded loop for animating changes to the layers. Instead, the application 210A and/or the OS 210B includes code that indicates a change in the state of a layer (e.g., indicates a change in position of a layer). The GRA infrastructure 220 determines from the changes made to the layers in the layer tree 222C what implicit animation to perform on the layers, and then the GRA infrastructure 220 explicitly performs that animation on the layers using the render tree 226. Accordingly, animations can be abstracted in such a way that the code of the application 210A and/or the OS 210B does not need to run at the frame rate 280. This allows the animation for objects/layers to be decoupled from the logic of the application 210A and/or the OS 210B, which in turn allows animations of the application 210A and/or the OS 210B to run on separate threads in the rendering process 200.

The animation and compositing process 224 can perform a number of different types of animations 270 on layers or objects. For example, if the OS 210B operates on the layer tree 222C to change a layer from start point A to end point B in a Z-direction (i.e., a direction that is perpendicular to the display), the animation and compositing process 224 automatically manipulates 270 (i.e., without input from the application 210A and/or the OS 210B) the representation of that layer in the render tree 226 to animate its movement from point A to point B on the display 260. In another example, if the OS 210B operates on the layer tree 222C to add a new layer to the layer tree 222C, the animation and compositing process 224 may automatically manipulate 270 the render tree 226 to fade in the new layer. In yet another example, if the OS 210B operates on the layer tree 222C to replace an existing layer with a new layer, the animation and compositing process 224 automatically manipulates 270 the render tree 226 to animate a transition from the existing layer to the new layer.

As shown above, generating and processing the layer tree 222C can require a large amount of computational resources. This is because generating and processing the system-based layer tree 222C requires computational resources for the application-only layer tree 222A, the snapshot-only layer tree 222B, the resulting system-based layer tree 222C, and the system-based render tree 226. Furthermore, as additional snapshots are added to snapshot-only layer tree 222B, each of the system-based layer tree 222C and the system-based render tree 226 will increase in size and complexity, which in turn requires deploying additional computational resources to deal with the increases. The increasing need for computational resources used by the snapshot-only layer tree 222B, the system-based layer tree 222C, and the system-based render tree 226 may assist with causing the rendering process 200, and in particular the GRA infrastructure 220, to be suboptimal.

Figure 3:
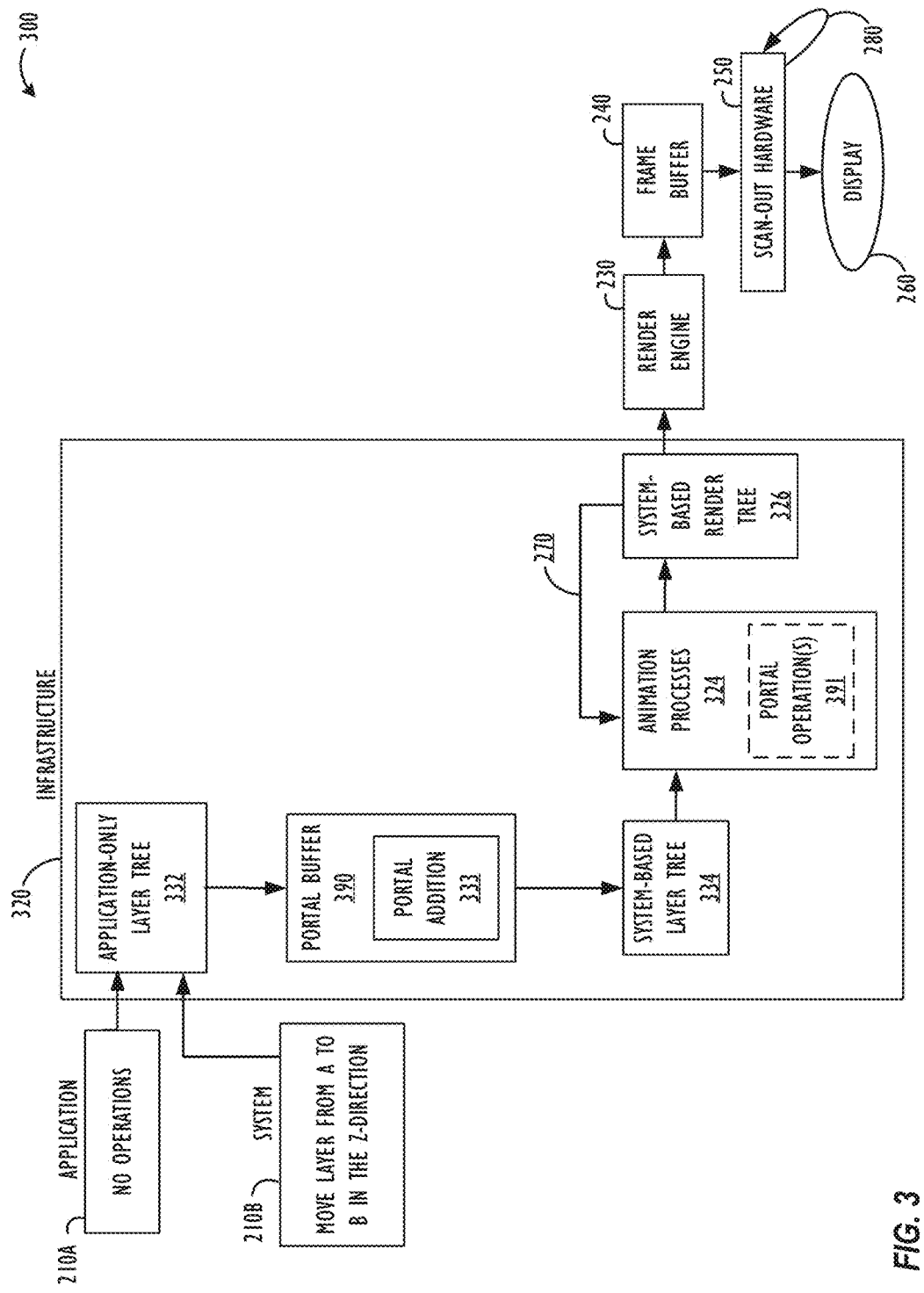
FIG. 3 illustrates an embodiment of a rendering process that includes one or more improved techniques for managing GUI objects.

With regard now to FIG. 3, an embodiment of a rendering process 300 that includes one or more improved techniques of managing GUI objects is shown. The rendering process 200 of FIG. 2 (which is discussed above) includes one or more components shared by the rendering process 300. For brevity, these components are not described again and will be identified with the same or similar reference numerals.

In the rendering process 300, an application 210A and/or an OS 210B inputs GUI information into a backing store (not shown), and a GRA infrastructure 320 is used to process the GUI information. Once the GRA infrastructure 320 has processed the GUI information, a render engine 230 renders the processed information into a frame buffer 240. The processing performed by the GRA infrastructure 320 includes graphics animation and compositing operations for the application 210A and/or the OS 210B. To perform the operations, the GRA infrastructure 320 divides the processing into: (i) a system-based layer tree 334 comprised of an application-only layer tree 332 augmented with one or more portal nodes 333; and (ii) a render tree 326. In the two-tree approach comprised of trees 334 and 326, the application-only layer tree 332 is exposed to the application 210A and the OS 210B, while the system-based layer tree 334 is exposed to the OS 210B (but not the application 210A). In this way, the layer tree 334 may be used for implicit animation and implicit layout of graphics objects/layers. On the other hand, the render tree 326 is manipulated and traversed by the render engine 230.

As stated above, the OS 210B can interact with the application-only layer tree 332 of the GRA infrastructure 320 when OS 210B needs to manipulate the hierarchy of layers in the layer tree 332. In this scenario, a portal buffer 390 may receive and process the layer tree 332 by adding one or more portals 333 into the layer tree 332 to generate a system-based layer tree 334.

Just like the layer tree 222C of FIG. 2, the data structure of the layer tree 334 is configured to hold a hierarchy of layers and is preferably smaller and more compact than the layer tree 222C of FIG. 2. One difference, however, between the layer tree 334 and the layer tree 222C of FIG. 2 is the presence of one or more portals 333 in the layer tree 334.

A portal refers to a logical reference to a GUI object specified by an application that enables an OS to access and process the specified GUI object without affecting any of the rules/assumptions required by the application for the specified GUI object. A portal is not a replication of the application's specified GUI object. Instead, a portal "points to" or "references" the application's GUI object. Consequently, a portal can be an alternative to a snapshot of the application's GUI object. In the context of layer trees, a portal "points to" or "references" another node within the layer tree. In this way, aggregations of an application-only layer tree and one or more versions of a snapshot-only layer tree are not required, unlike the requirement provided in the rendering process 200. It is important to note that, for one embodiment, a portal 333 in the layer tree 334 is not a snapshot or a replication even though a node referenced by the portal 333 will have a corresponding node in the render tree 326. For one embodiment, the layer tree 334 may be kept as small as possible using the portal(s) 333, while the render tree 326 is generated with all of the nodes. One advantage of process 300 is that it assists with generating and processing the layer tree 334 in a way that makes the layer tree 334 require a smaller amount of computational resources than the layer tree 222C of FIG. 2. This is because generating and processing the layer tree 334 does not require computational resources for the application-only layer tree 322A, one or more snapshot-only layer trees, and a cumulative layer tree formed from the application-only layer tree 322A and the snapshot-only layer tree(s). Instead, generating and processing the layer tree 334 requires computational resources for an application-only layer tree 322A augmented with one or more portals. Such a layer tree 334, therefore, may assist with improving the operation of the rendering process 300 and in particular, improving the operation of the GRA infrastructure 320. When the OS 210B commits an event or change to the layer tree 332, each of those changes are added to layer 332 using the portal(s) 333. The system-based layer tree 334 may then be used to build the system GUI that is based on the application 210A and the OS 210B. In this way, the OS 210 can commit changes to an application's specified GUI objects using an application-only layer tree 332 augmented with the portal(s) 333 (i.e., the system-based layer tree 334) without using any snapshots, without using any snapshot-only layer trees, without using any aggregated trees that combine the application-only layer tree and the snapshot-only layer tree, and without affecting the layer tree 332.

The system-based layer tree 334 may then be committed to an animation and compositing process 324 of the GRA infrastructure 320. This process 324 determines zero or more implicit animation functions of the GRA infrastructure 320 to use on the system-based layer tree 334 based on the committed events or changes for each layer of the layer tree 334. The animation and compositing process 324 may then perform explicit animation of the events or changes and configure the layout of the layers in the render tree 326. The animation and layout of the render tree 326 may then be rendered by the render engine 230 and output to the frame buffer 240. Similar to what was described above in connection with FIG. 2, any manipulation of layers made by the application 210A and/or the OS 210B to the layer tree 334 are not evaluated at the frame rate 280 of the display 260. Instead, changes in the render tree 326 are traversed and updated at the frame rate 380. Also, and similar to what was described in connection with FIG. 2, the GRA infrastructure 320 separates the animation and compositing of layers from the application 210A and/or OS 210B.

One difference between process 224 of FIG. 2 and process 324 is the portal operation(s) 391 (also referred to herein as transformation(s) 391). The portal operation(s) 391 are applied to content in the render tree 326 that corresponds to content referenced by one or more portals 333 in the layer tree 334. For one embodiment, the animation and compositing process 324 can perform a number of different types of optional portal operations 391 on layers or objects referenced by portals 333. For example, if the OS 210B operates on the layer tree 334 to change a layer referenced by a portal 333 from start point A to end point B in a Z-direction (i.e., a direction that is perpendicular to the display), the animation and compositing process 324 automatically manipulates 270 the representation of a corresponding layer in the render tree 326 based on portal operation(s) 391 to animate its movement from point A to point B on the display 260. In another example, if the OS 210B operates on the layer tree 334 to add a new layer referenced by a portal 333 to the layer tree 334, the animation and compositing process 324 may automatically manipulate 270 the render tree 326 based on the portal operation(s) 391 to fade in the new layer. In yet another example, if the OS 210B operates on the layer tree 334 to replace an existing layer with a new layer referenced by a portal 333, the animation and compositing process 324 may automatically manipulate 270 the render tree 326 based on the portal operation(s) 391 to animate a transition from the existing layer to the new layer. Additional details about portal operation(s) 391 are provided below in connection with FIGS. 4 and 5A-5C.

Figure 4:
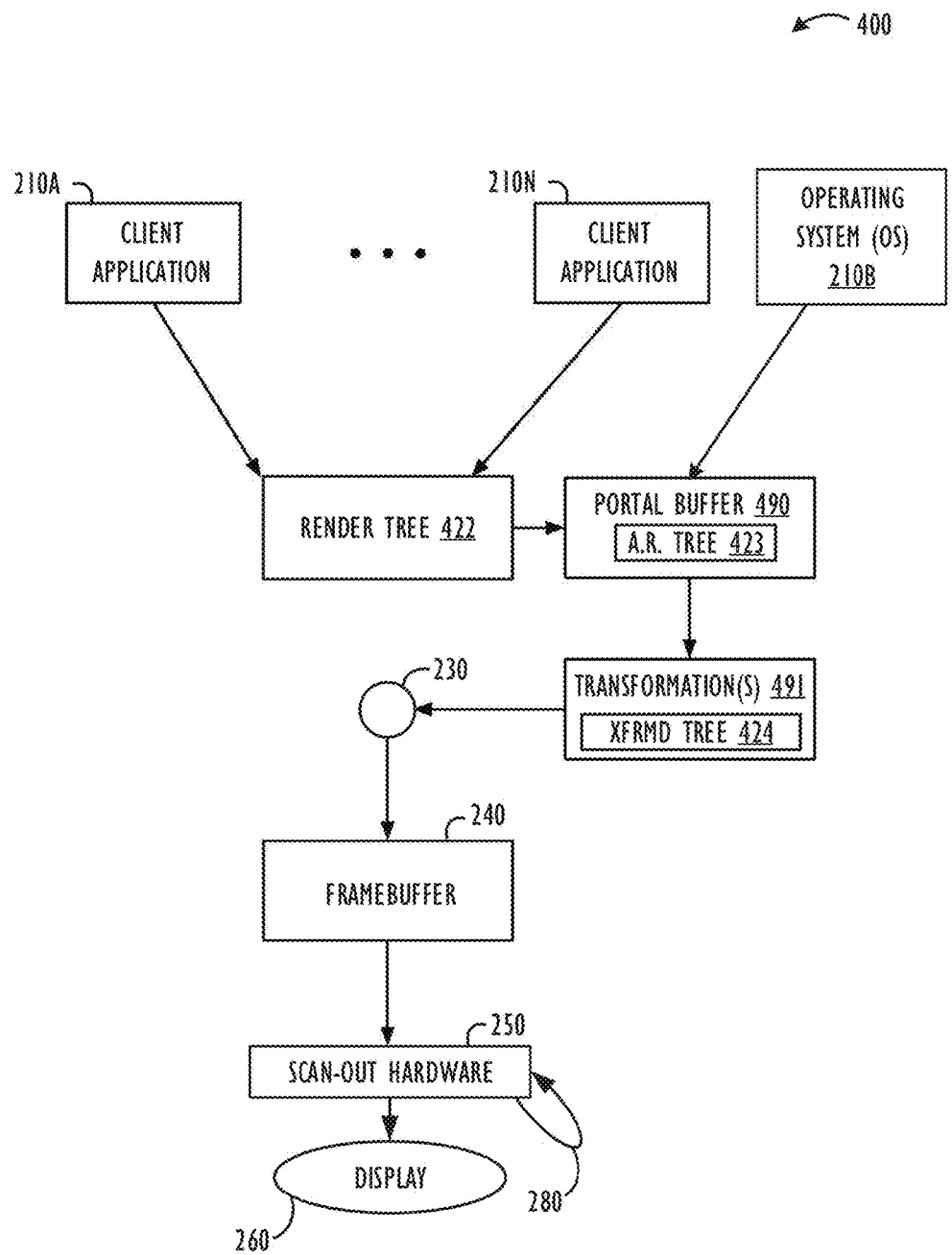
FIG. 4 illustrates another embodiment of a rendering process that includes one or more improved techniques for managing GUI objects.

FIG. 4 illustrates another embodiment of a rendering process 400 that includes one or more improved techniques for managing GUI objects. Process 400 can be implemented by one or more processors of a rendering system executing instructions from a memory or a non-transitory computer-readable storage device. Process 400 begins when one or more application-only render trees that correspond to one or more client applications 210A-N are aggregated to form a cumulative application-only render tree 422. In process 400, a portal buffer 490 receives the render tree 422 and adds one or more portals to the render tree 422 based on changes applied by the OS 210B. Similar to the description provided above in connection with FIG. 3, the changes applied to the cumulative application-only render tree 422 by the OS 210B are committed to the one or more portals. This new render tree is an augmented render tree 423 (referred to as "A.R. tree 423" in FIG. 4). In this way, there is no need for duplicating any of the client applications' 210A-N individual render trees, which can assist with reducing computational resources required to process content of the applications 210A-N and the OS 210B.

Portal content referenced by portals within the augmented render tree 423 may be manipulated by transforming 491 the portal content at the location in the render tree 423 receiving the portal content. Transformation 491 of portal content can include changing characteristics of pixels at the specified location in the render tree 423 receiving the content referenced by the portal. In this way, the location receiving the content referenced by the portal is updated with transformed content that is different from portal content itself (i.e., the source content). Transformations 491 include, but are not limited to, changing a pixel's rotation characteristic, shear characteristic, and/or speed characteristic. These transformations 491 will generally be done by operations applied to one or more values associated with the pixel (i.e., pixel values at the portal location that are obtained from the actual content referenced by the portal). Transformations 491 also include applying a filter to a pixel to manipulate characteristics of the pixel. For example, and for one embodiment, a filter may be applied to a pixel implicated by a portal to modify an opacity characteristic of the pixel and/or a blur characteristic of the pixel's value. Additional details about applying transformations to portal(s) in layer and/or render trees are described below in connection with FIGS. 5A-5C.

After the transformations 491 have been applied to the augmented render tree 423, the transformed render tree 424 is generated (referred to as "XFRMD tree 424" in FIG. 4). The transformed render tree 424 is then rendered by the render engine 230 into a frame buffer 240. When rendering is completed, scan-out hardware 250 outputs the rendered information in the frame buffer 240 for display 260 using a frame rate 280 of the display 260.

Figure 5A:
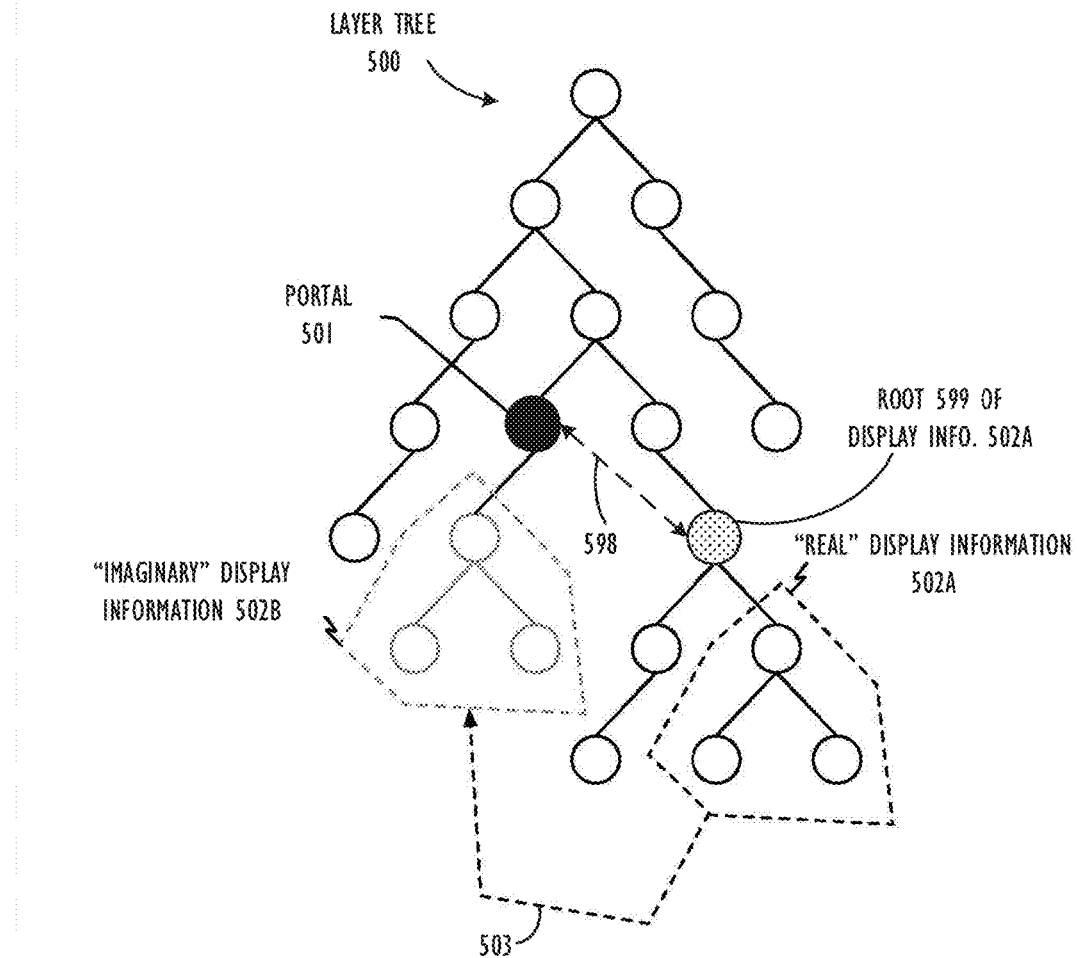
FIGS. 5A-5C illustrate an exemplary layer tree that includes a portal together with a render tree generated based on the layer tree in accordance with an embodiment.

With regard now to FIG. 5A, which illustrates an exemplary layer tree 500 that includes a portal node 501 in accordance with an embodiment. For this embodiment, the portal node 501 has a source layer that it is configured to effectively duplicate source content from another node or set of nodes of the layer tree 500. For one embodiment, and as shown in FIG. 5A, the portal node 501 has a relationship 598 with the source content duplicated by the portal node 501 (i.e., the root node 599 of the nodes representing "real" display information 502A).

For one embodiment, the portal node 501 may represent changes committed by an OS (e.g., the OS 210B of FIG. 3 and/or FIG. 4, etc.) to an application GUI object that is presented via a system GUI. As shown, the portal node 501 "points to" 503 or "references" 503 the nodes representing the "real" display information 502A without replicating the nodes representing the "real" display information 502A at the portal node 501's location. Instead, the portal node 501 acts as a gateway to the nodes representing the "real" display information 502A. In FIG. 5, the child or children of the portal node 501 are shown as "imaginary" information 502B. It is to be appreciated that this "imaginary" information 502B is only provided to illustrate the embodiments described herein. For one embodiment, the portal node 501 can be configured to hide the display information 502A, such that the information is no longer accessible to the animating and compositing process 324 that generates a render tree using the layer tree 500.

Figure 5B:
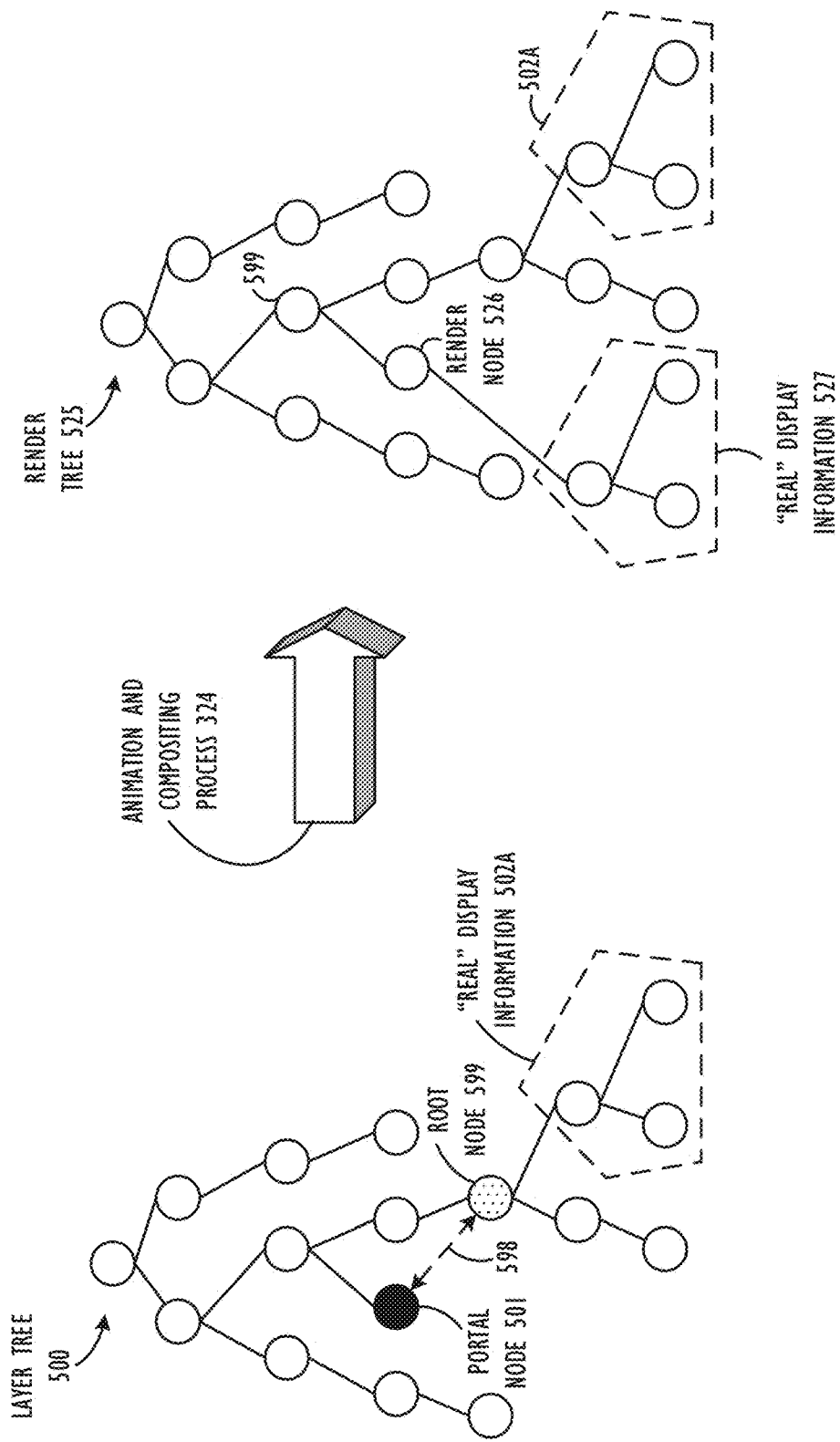

With regard now to FIG. 5B, which illustrates the animation and compositing process 324 generating a render tree 525 based on the layer tree 500. The render tree 525 is generated based on the process 324's performance of implicit and explicit animation of events or changes in the layer tree 500. For one embodiment, the process 324 uses the portal node 501 to generate a corresponding render node 526 in the render tree 525. The process 324 also uses the nodes representing the information 502A, which the portal node 501 provided a gateway to, for generating a corresponding set of nodes representing information 527 in the render tree 525. As shown in FIG. 5B, the render node 526 is the parent node for the nodes representing display information 527. For one embodiment, the display information 527 is a replica of the display information 502A; however, other embodiments are not so limited. For example and for one embodiment, the corresponding information 527 can be a transformed version of the information 502A, as will be described below in connection with FIG. 5C.

In the render tree 525, characteristics of the nodes representing information 527 may differ from the characteristics of the nodes representing information 502A even when information 527 is a replica of information 502A. This is because the nodes representing information 527 have different dependencies than the nodes representing information 502A. In other words, the nodes representing information 527 have different parent nodes than the nodes representing information 502A. This difference in parent nodes (and the corresponding information in those nodes) may affect how the nodes representing information 527 and nodes representing information 502A are rendered. The characteristics that are affected by these dependencies include, but are not limited to, opacity, transformation (e.g., rotation, scaling, shearing, etc.), position, and time (e.g., a speed of rotation, a speed of animation, etc.). For a first example, opacities of the nodes representing display information 527 are inherited from their parent nodes. For this example, because the opacities of the nodes representing display information 502A are inherited from a different set of parents than the opacities of the nodes representing display information 527, the display information 527 and the display information 502A may be rendered with differing opacities. For a second example, transformations (e.g., rotation, scaling, shearing, etc.) affecting the parents of the nodes representing display information 527 will be inherited by the nodes representing display information 527. Consequently, and for this second example, because the transformations affecting the nodes representing display information 502A are inherited from a different set of parents than the transformations affecting the nodes representing display information 527, the display information 527 and the display information 502A may be rendered with differing transformations. For a third example, positions affecting the parents of the nodes representing display information 527 will be inherited by the nodes representing display information 527. So for this third example, because the positions affecting the nodes representing display information 502A are inherited from a different set of parents than the positions affecting the nodes representing display information 527, the display information 527 and the display information 502A may be rendered with differing positions. For a fourth example, time characteristics (e.g., a speed of rotation, a speed of animation, etc.) affecting the parents of the nodes representing display information 527 will also be inherited by the nodes representing display information 527. Consequently, and for this fourth example, because the time characteristics affecting the nodes representing display information 502A are inherited from a different set of parents than the time characteristics affecting the nodes representing display information 527, the display information 527 and the display information 502A will be rendered with differing time characteristics.

For one embodiment, the characteristics of the nodes representing the display information 527 can be made to match the characteristics of the nodes representing the display information 502A. This is done by traversing up the render tree 525 until a common parent node that affects both nodes 502A and 527 is identified. In FIG. 5B, this common parent is node 599 of the render tree 525. Next, the characteristics of each node between the common parent node 599 and the nodes 527 are adjusted until the characteristics of the nodes 527 match the characteristics of the nodes 502A. This matching process can be performed to match opacity, transformations, position, time, and any other characteristics that a child node may inherit from a parent node.

Figure 5C:
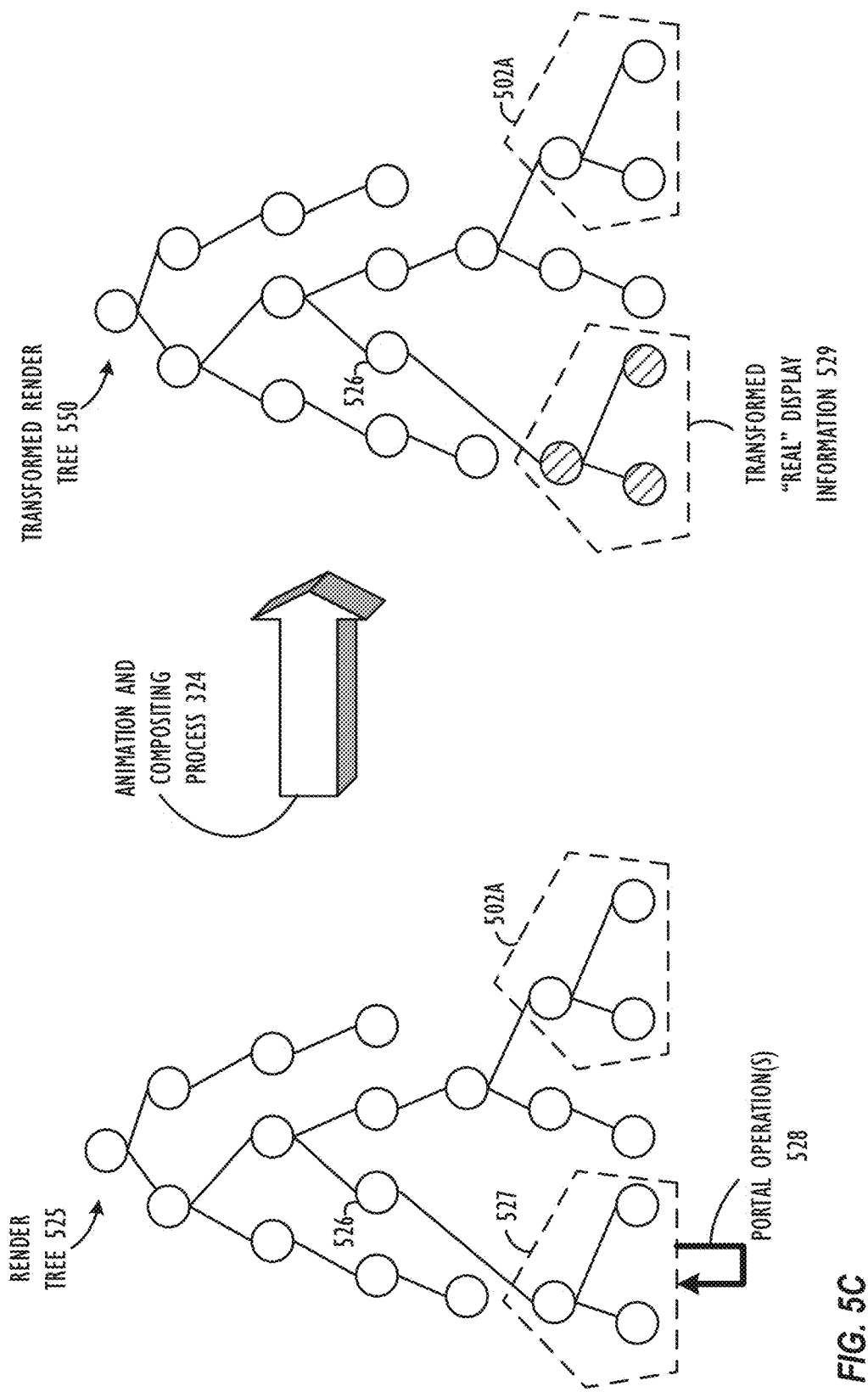

Referring now to FIG. 5C, which illustrates the animation and compositing process 324 generating a transformed render tree 550 based on the render tree 525. The transformed render tree 550 is generated based on the process 324's application of portal operation(s) 528 to the nodes in the render tree 525 that represent the display information 527. For one embodiment, the portal operation(s) 528 include any known transformations. Examples of such transformations include, but are not limited to, affine transformations, horizontal reflection, vertical reflection, horizontal shearing, vertical shearing, rotation, scaling, and application of filters (e.g., blurring, transparency, opacity, etc.). As shown in FIG. 5C, the transformed render tree 550 may include a set of nodes 529 that result from a modification of the nodes 527 using the portal operation(s) 528. In this way, additional functionality can be added to the render tree 525 generated from the layer tree 500.

Figure 6:
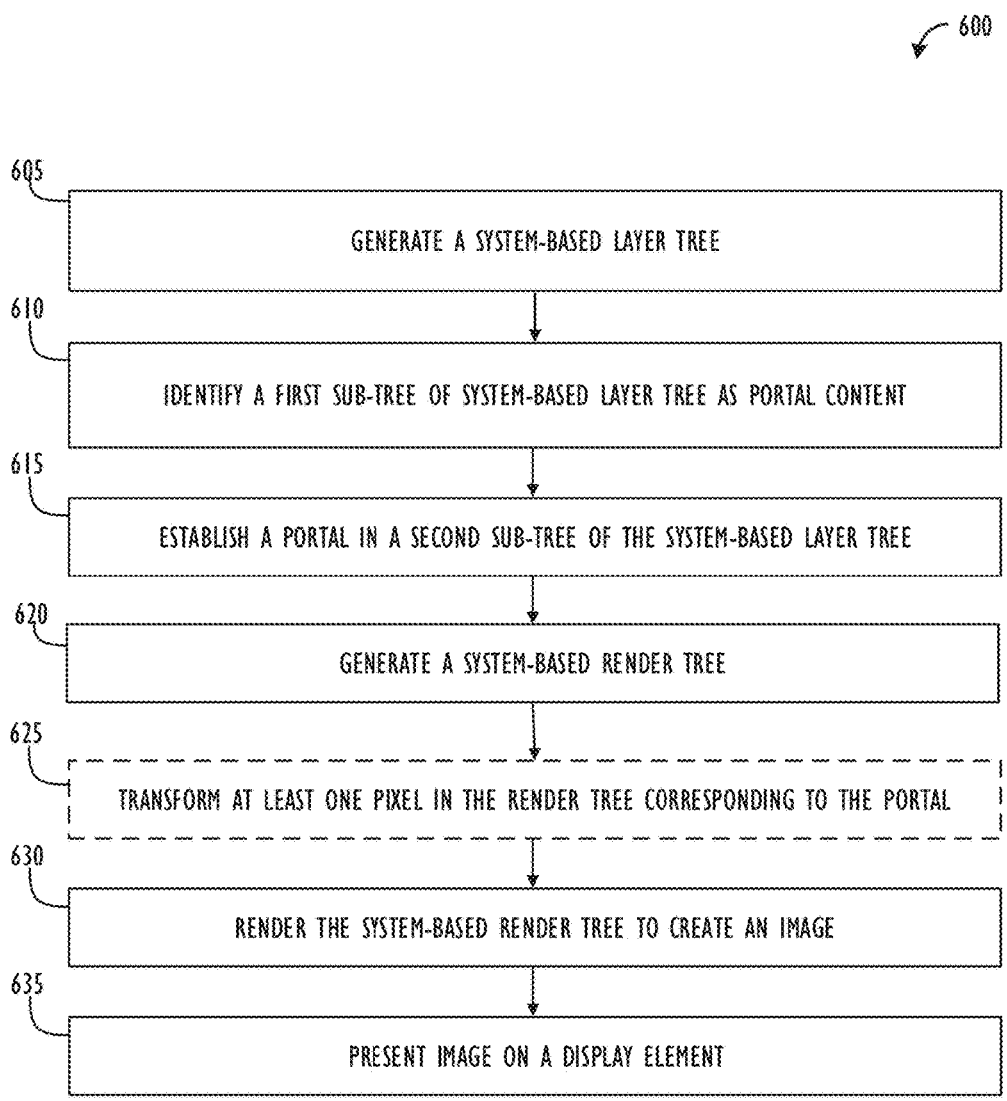
FIG. 6 is a diagram illustrating a technique for generating and utilizing a system-based render tree based on a layer tree that includes at least one portal in accordance with an embodiment.

Turning now to FIG. 6 which illustrates a technique 600 for generating and utilizing a system-based render tree based on a system-based layer tree that includes at least one portal, in accordance with one embodiment. For one embodiment, technique 600 is implemented within a GRA infrastructure (e.g., CORE ANIMATION®, etc.). For another embodiment, technique 600 is implemented within an OS (e.g., iOS, OS X®, etc.). For yet another embodiment, technique 600 is implemented by one or more processors of a computer system (e.g., a mobile computer, a smartphone, a desktop, a tablet computer, a laptop computer, a server, a workstation, a wearable device, an Internet-of-Things (IoT) device, a vehicle, any other known computer system, etc.).

Technique 600 begins at operation 605, where a system-based layer tree is generated. For one embodiment, the system-based layer tree is generated in accordance with one or more of the embodiments described above in connection with FIGS. 3 and 5A-5C. Next, technique 600 proceeds to operation 610. Here, a first sub-tree of the layer tree is identified as portal content. For one embodiment, and with regard to FIGS. 5A-5B, the nodes representing display information 502A can be identified as portal content. Technique 600 proceeds to operation 615, where a portal is established in a second sub-tree of the system-based layer tree. For one embodiment, and with regard to FIGS. 5A-5B, the portal node 501 is established to act as a gateway to the identified portal content (i.e., the nodes representing display information 502A). At operation 620, technique 600 includes generating a system-based render tree based on the layer tree that includes the portal. For one embodiment, and with regard to FIG. 5B, the layer tree 500 is processed by the animation and compositing process 324 to generate a render tree 525. In the render tree 525, the portal node 501 is used to generate a render node 526 and the nodes 502A of the layer tree 500 are used to generate nodes 527. In the render tree 525, the nodes 527 are the children of the render node 526.

Technique 600 also includes optional operation 625. This operation includes applying transformations (also referred to herein as portal operations) to at least one pixel in the render tree that corresponds to the portal. For one embodiment, and with regard to FIGS. 5B-5C, the pixels corresponding to nodes 527 are transformed using one or more portal operations. In this way, the pixels corresponding to nodes 529 are generated. After operation 620 or operation 625, technique 600 proceeds to operation 630. This operation includes rendering the system-based render tree to create an image. For one embodiment, this rendering operation is performed as described above in connection with one or more of FIGS. 3-5C. For example, and with regard to FIG. 5C, this rendering operation includes rendering one or more of the render tree 525 or the transformed render tree 550 by render engine 230 into one or more memory buffers (e.g., assembly and/or frame buffer 240, etc.). At the end of operation 635, scan-out hardware 250 takes the content of memory buffer(s) 240 and sends it to display device 260 (e.g., a standard computer screen or a touch screen).

Figure 7:
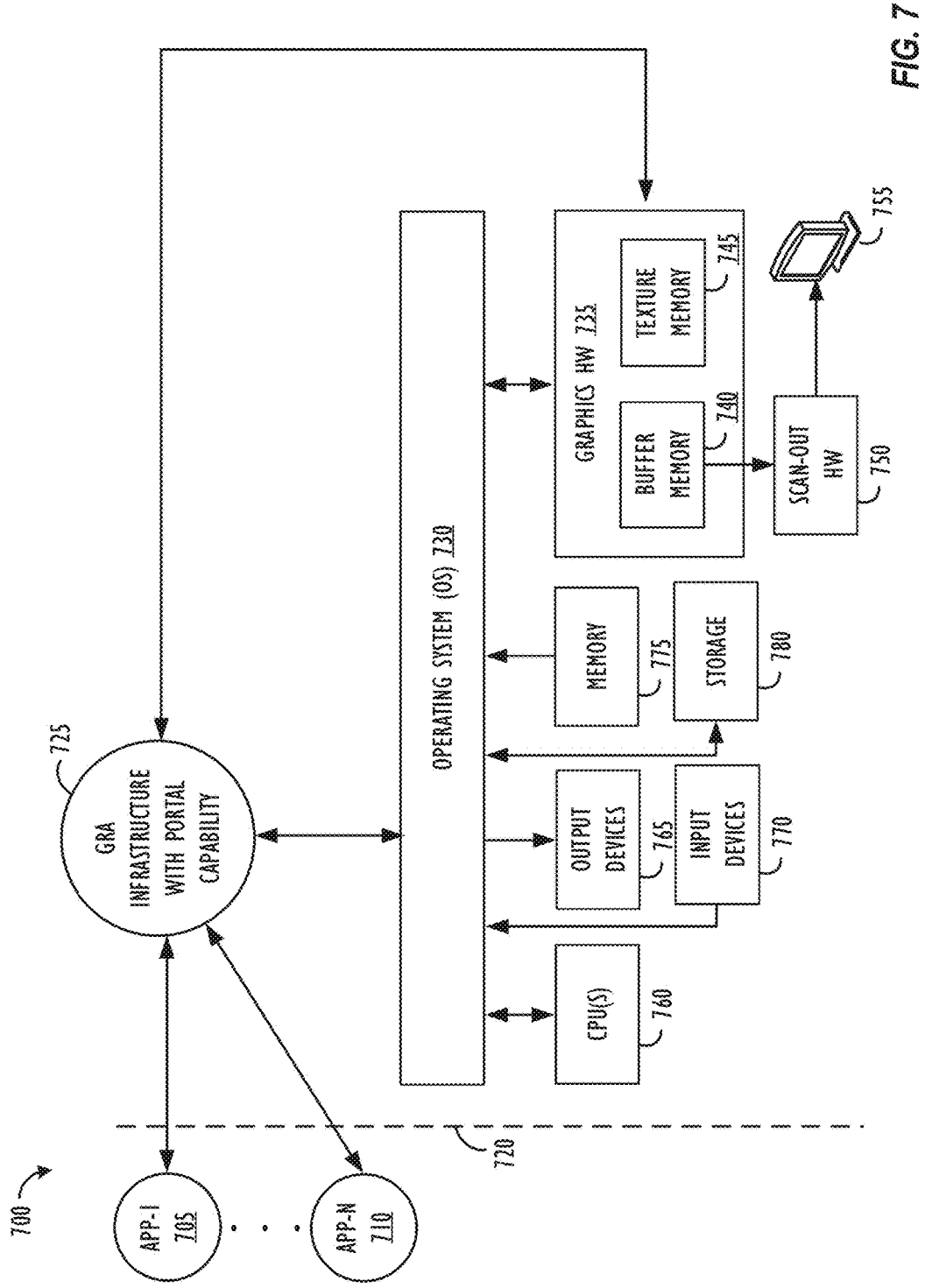
FIG. 7 is a block diagram illustrating a system that may implement the embodiments described herein.

Turning now to FIG. 7, illustrative computer system 700 within which an embodiment of a GRA infrastructure with portal capability 725 may be implemented is shown. As described above, GRA infrastructure 725 may, for example, be the CORE ANIMATION® GRA infrastructure. Computer system 700 includes one or more client applications (705 and 710) that communicate with GRA infrastructure 725 through one or more application programming interface (API) libraries 720. Applications 705 and 710 may, for example, include media players, web browsers, games, office software, databases, system utilities, etc. In one embodiment, applications 705 and 710 communicate with GRA infrastructure 725 through an OpenGL API. The GRA infrastructure 725 may communicate with OS 730 and graphics hardware 735 through one or more APIs such as OpenGL® or Direct3D® (not shown). OpenGL® is a registered trademark of Silicon Graphics International Corporation and DIRECT3D® is a registered trademark of the Microsoft Corporation. Graphics hardware 735 typically includes both working or buffer memory 740 and texture memory 745. Texture memory may be used to store texture maps so that they may be applied to the surfaces of graphical objects. Scan-out hardware 750 takes the content of memory buffers (e.g., assembly or frame buffer memory) and sends it to display device 755 (e.g., a standard computer screen or a touch screen).

System 700 is also shown to include one or more CPUs 760, one or more output devices 765, one or more input devices 770, memory 775, and storage 780. CPUs 760 may include any programmable control device (e.g., one or more processing cores, etc.) CPUs 760 may also be implemented as a custom designed circuit that may be embodied in hardware devices such as application specific integrated circuits (ASICs) and field programmable gate arrays (FPGAs). Output devices 765 and input devices 770 may provide audio, and/or visual and/or tactile based interfaces. Memory 775 may include one or more different types of media (typically solid-state). For example, memory 775 may include memory cache, read-only memory (ROM), and/or random access memory (RAM). Storage 780 may store media (e.g., audio, image and video files), computer program instructions or software, preference information, device profile information, and any other suitable data. Storage 780 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 775 and storage 780 may be used to retain computer program instructions organized into one or more modules and written in any desired computer programming language. When executed by CPUs 760 and/or graphics hardware 735 such computer program code may implement one or more of the techniques described herein.

While not shown, it will be understood that system 700 may also include communication interfaces to enable communicate with other equipment via one or more networks (e.g., local networks such as a USB network, a business' local area network, or a wide area network such as the Internet). System 700 may represent any number of computational platforms such as, without limitation, personal desktop computers, notebook computers, workstation computer systems, server computer systems, pad computer systems and other mobile platforms such as personal music and video devices and mobile telephones.

In the description provided herein, numerous specific details are set forth for purposes of explanation in order to provide a thorough understanding of the embodiments described herein. As part of this description, some of this disclosure's drawings represent structures and devices in block diagram form in order to avoid obscuring the embodiments described herein. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment," "an embodiment," "another embodiment," "some embodiments," "other embodiments," and their variations means that a particular feature, structure, or characteristic described in connection with the embodiment is included in at least one implementation of the embodiments described herein, and multiple references to "one embodiment," "an embodiment," "another embodiment," "some embodiments," "other embodiments," and their variations should not be understood as necessarily all referring to the same embodiment.

It will be appreciated that, in the development of any actual implementation (as in any development project), numerous decisions must be made to achieve the developers' specific goals (e.g., compliance with system-related constraints and business-related constraints), and that these goals may vary from one implementation to another. It will also be appreciated that such development efforts might be complex and time-consuming, but would nevertheless be a routine undertaking for those of ordinary skill in the design of an implementation of systems having the benefit of this disclosure.

Also, the above description is intended to be illustrative, and not restrictive. The material has been presented to enable any person skilled in the art to make and use the invention as claimed and is provided in the context of particular embodiments, variations of which will be readily apparent to those skilled in the art (e.g., each of the disclosed embodiments may be used in combination with one or more of the other disclosed embodiments). In addition, it will be understood that some of the operations identified herein may be performed in different orders. Therefore, the scope of the inventive subject matter should be determined with reference to the appended claims, along with the full scope of equivalents to which such claims are entitled. In the appended claims, the terms "including" and "in which" are used as the plain-English equivalents of the respective terms "comprising" and "wherein."

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

In this document, reference has been made to one or more common law or registered trademarks. These and any other marks referenced herein may be common law or registered trademarks of third parties affiliated or unaffiliated with the applicant or the assignee. Use of these marks is by way of example and shall not be construed as descriptive or to limit the scope of the embodiments described herein to material associated only with such marks.

What is claimed is:

1. A computer rendering system, comprising:
   memory; and
   one or more processors operatively coupled to the memory, the one or more processors configured to execute instructions stored in the memory to cause the one or more processors to:
      generate a system-based layer tree having a plurality of sub-trees, each sub-tree including one or more nodes, wherein a first sub-tree corresponds to at least a portion of a first client application's layer tree or render tree;
      identify the first sub-tree as portal content, the portal content including a plurality of pixels;
      establish a portal node in a second sub-tree of the system-based layer tree, the portal node being a logical reference to the portal content, wherein the portal node is not a replication of the portal content, and wherein the first and second sub-trees are different from each other;
      generate a system-based render tree based on the system-based layer tree by transforming the portal content at the portal node in the second sub-tree, wherein the system-based render tree comprises a modified portal content based on transforming the portal content; and
      cause a rendering of the system-based render tree to the memory to create an image.

2. The computer rendering system of claim 1, wherein the instructions to cause the one or more processors to cause the rendering comprise instructions to cause the one or more processors to cause the rendering, for each pixel referenced by the second sub-tree's portal node, of a corresponding pixel from the first sub-tree to the memory.

3. The computer rendering system of claim 1, wherein the instructions to cause the one or more processors to cause the rendering comprise instructions to cause the one or more processors to:
   obtain, for each pixel referenced by the second sub-tree's portal node, a pixel value of a corresponding pixel from the first sub-tree;
   transform the pixel value to a new pixel value; and
   cause the rendering of the new pixel value to the memory.

4. The computer rendering system of claim 3, wherein the instructions to cause the one or more processors to transform the pixel value to the new pixel value comprise instructions to cause the one or more processors to modify one or more of a rotation characteristic of the pixel value, a shear characteristic of the pixel value, and a speed characteristic of the pixel value.

5. The computer rendering system of claim 3, wherein the instructions to cause the one or more processors to transform the pixel value to the new pixel value comprise instructions to cause the one or more processors to apply a filter to the pixel value to generate the new pixel value.

6. The computer rendering system of claim 5, wherein the instructions to cause the one or more processors to apply the filter to the pixel value further comprise instructions to cause the one or more processors to modify, using the filter, one or more of an opacity characteristic of the pixel value and a blur characteristic of the pixel value.

7. The computer rendering system of claim 1, wherein the instructions to cause the one or more processors to generate the system-based render tree comprise instructions to cause the one or more processors to generate the system-based render tree based on a system-based layer tree that comprises the first client application's layer tree.

8. A computer-implemented method for rendering images, comprising:
   generating, by one or more processors, a system-based layer tree having a plurality of sub-trees, each sub-tree including one or more nodes, wherein a first sub-tree corresponds to at least a portion of a first client application's layer tree or render tree;
   identifying the first sub-tree as portal content, the portal content including a plurality of pixels;
   establishing a portal node in a second sub-tree of the system-based layer tree, the portal node being a logical reference to the portal content, wherein the portal node is not a replication of the portal content, and wherein the first and second sub-trees are different from each other;
   generating a system-based render tree based on the system-based layer tree by transforming the portal content at the portal node in the second sub-tree, wherein the system-based render tree comprises a modified portal content based on transforming the portal content; and
   causing a rendering of the system-based render tree to a memory to create an image.

9. The computer-implemented method of claim 8, wherein causing the rendering of the system-based layer tree comprises causing a rendering, for each pixel referenced by the second sub-tree's portal node, of a corresponding pixel from the first sub-tree to the memory.

10. The computer-implemented method of claim 8, wherein causing the rendering of the system-based layer tree comprises causing:
obtaining, for each pixel referenced by the second sub-tree's portal node, a pixel value of a corresponding pixel from the first sub-tree;
transforming the pixel value to a new pixel value; and
causing the rendering of the new pixel value to the memory.

11. The computer-implemented method of claim 10, wherein transforming the pixel value to the new pixel value comprises modifying one or more of a rotation characteristic of the pixel value, a shear characteristic of the pixel value, and a speed characteristic of the pixel value.

12. The computer-implemented method of claim 10, wherein transforming the pixel value to the new pixel value comprises applying a filter to the pixel value to generate the new pixel value.

13. The computer-implemented method of claim 12, wherein applying the filter to the pixel value to generate the new pixel value comprises modifying, using the filter, one or more of an opacity characteristic of the pixel value and a blur characteristic of the pixel value.

14. The computer-implemented method of claim 8, wherein generating the system-based render tree comprises generating the system-based render tree based on a system-based layer tree that comprises the first client application's layer tree.

15. A non-transitory computer readable storage medium storing instructions, the instructions comprising instructions executable by one or more processors the one or more processors to:
generate a system-based layer tree having a plurality of sub-trees, each sub-tree including one or more nodes, wherein a first sub-tree corresponds to at least a portion of a first client application's layer tree or render tree;
identify the first sub-tree as portal content, the portal content including a plurality of pixels;
establish a portal node in a second sub-tree of the system-based layer tree, the portal node being a logical reference to the portal content, wherein the portal node is not a replication of the portal content, and wherein the first and second sub-trees are different from each other;
generate a system-based render tree based on the system-based layer tree by transforming the portal content at the portal node in the second sub-tree, wherein the system-based render tree comprises a modified portal content based on transforming the portal content; and
cause a rendering of the system-based render tree to a memory to create an image.

16. The non-transitory computer readable storage medium of claim 15, wherein the instructions to cause the one or more processors to cause the rendering comprise instructions to cause the one or more processors to cause a rendering, for each pixel referenced by the second sub-tree's portal node, of a corresponding pixel from the first sub-tree to the memory.

17. The non-transitory computer readable storage medium of claim 15, wherein the instructions to cause the one or more processors to cause a rendering comprise instructions to cause the one or more processors to:
obtain, for each pixel referenced by the second sub-tree's portal node, a pixel value of a corresponding pixel from the first sub-tree;
transform the pixel value to a new pixel value; and
cause the rendering of the new pixel value to the memory.

18. The non-transitory computer readable storage medium of claim 17, wherein the instructions to cause the one or more processors to transform the pixel value to the new pixel value comprise instructions to cause the one or more processors to modify one or more of a rotation characteristic of the pixel value, a shear characteristic of the pixel value, and a speed characteristic of the pixel value.

19. The non-transitory computer readable storage medium of claim 17, wherein the instructions to cause the one or more processors to transform the pixel value to the new pixel value comprise instructions to cause the one or more processors to apply a filter to the pixel value to generate the new pixel value.

20. The non-transitory computer readable storage medium of claim 19, wherein the instructions to cause the one or more processors to apply the filter to the pixel value to generate the new pixel value comprise instructions to cause the one or more processors to modify, using the filter, one or more of an opacity characteristic of the pixel value and a blur characteristic of the pixel value.

21. The non-transitory computer readable storage medium of claim 15, wherein the instructions to cause the one or more processors to generate the system-based render tree comprise instructions to cause the one or more processors to generate the system-based render tree based on a system-based layer tree that comprises the first client application's layer tree.

* * * * *